United States Patent [19]
Fend

[11] Patent Number: 4,759,131
[45] Date of Patent: Jul. 26, 1988

[54] METHOD AND APPARATUS FOR MARKING IMAGE POINTS IN PHOTOGRAMMETRIC SURVEYS

[75] Inventor: Herbert Fend, Maeder, Austria

[73] Assignee: Wild Heerbrugg AG, Heerbrugg, Switzerland

[21] Appl. No.: 13,177

[22] Filed: Feb. 9, 1987

Related U.S. Application Data

[63] Continuation of Ser. No. 721,654, Apr. 10, 1985, abandoned.

[30] Foreign Application Priority Data

Apr. 24, 1984 [CH] Switzerland ................. 2016/84

[51] Int. Cl.$^4$ ............................................. B43L 13/00
[52] U.S. Cl. .................................. 33/18.1; 33/666; 346/1.1; 346/77 E
[58] Field of Search ............. 33/18.1, 18.2, 20.4, 33/1 A, 666; 346/1.1, 77 E

[56] References Cited

U.S. PATENT DOCUMENTS 2,661,998 12/1953 Pessel .................................. 346/1.1
3,205,587  9/1965 Kilburn .
3,890,892  6/1975 Loose et al. ....................... 346/77 E

FOREIGN PATENT DOCUMENTS 34865 2/1935 Netherlands ..................... 33/20.4

Primary Examiner—William D. Martin, Jr.
Attorney, Agent, or Firm—Helfgott & Karas

[57] ABSTRACT

A stylus is briefly placed on the surface coating of photographs for forming an artificial marking symbol on the coating. The stylus oscillates in the ultrasonic frequency range. Part of the oscillation energy of the stylus is converted into frictional heat producing a marking symbol in the coating in the form of a high contrast annular bead. The apparatus comprises a stylus, a mechanical lowering device, an electroacoustic transducer for producing the ultrasonic oscillations of the stylus, and a frequency generator, an amplifier and a voltage/current converter connected in series with the electroacoustic transducer. The transducer is supplied with a signal from the frequency generator, which signal is kept constant by a control circuit provided on the generator. The electroacoustic transducer comprises a resonator fixed to the stylus and a piezo-oscillator mechanically connected to the resonator and electrically connected to the voltage/current converter to match impedance and regulate the amplitude of the signal supplied at the piezo-oscillator.

14 Claims, 3 Drawing Sheets

METHOD AND APPARATUS FOR MARKING IMAGE POINTS IN PHOTOGRAMMETRIC SURVEYS

This application is a continuation of application Ser. No. 721,654 filed Apr. 10, 1985 abandoned.

FIELD OF THE INVENTION

The present invention relates to a method and apparatus for making image points in photogrammetric surveys with a stylus oscillated at an ultrasonic frequency.

BACKGROUND OF THE INVENTION

In photogrammetric aerotriangulation, plotting is reduced to the measurement of coordinates in aerial photographs by analytical measuring methods. Conventional plotting apparatus available for this purpose require completely satisfactory surveying or measurement of image points of several images with respect to one another. This surveying is much more accurate if characteristic points are already precisely marked on the images by photographing signalled or indicated ground features or terrain points, or by applying identical marking symbols to corresponding images.

Signalling of terrain points is expensive due to the required work in the field. If signalled terrain points are not provided, the use of non-signalled natural features subjects interpretation to the risk of identification errors, and sometimes renders interpretation impossible, e.g., in terrain with few details. Thus, marking processes and apparatus have been provided for precisely positioning artificial marking symbols on corresponding image points of several images. Methods and corresponding apparatus are already known to artificially mark the surface of the photographic material for photogrammetric triangulation. Mechanical, electrical, electro-optical and thermal methods exist for this purpose, but suffer from serious disadvantages.

Cutting a point in a photographic emulsion using a rotary, specially shaped steel, diamond or sapphire stylus creates non-clearly defined, non-circular holes and emulsion particles (cuttings). The particles close the holes again or deform the holes in some other way causing serious measuring errors.

Impressing the emulsion by briefly pressing a very small diameter steel ball or a sapphire needle in the emulsion leads to rounded impressions, and consequently, to poorly defined hole boundaries. The impression formed holes can also be made indistinct through residues. Finally, the elasticity of the emulsion causes the holes made by this impression method to have only a very short life. Additionally, it is not possible to make holes with a sufficiently small diameter.

The marking of the emulsion by an electric discharge has proved to be too inaccurate and has not been adopted in practice. This is because the path of the spark produced and its striking point on the image surface cannot be sufficiently controlled.

Holes burnt into the emulsion by optical beams, particularly laser pulses, initially require a significant technical expenditure. In addition, such methods are dangerous to the operator's eyes, and special protective measures are required for observing the images during marking. Moreover, the shape of the holes obtained is not of an adequate quality.

In thermal methods, an electrically heated stylus is briefly pressed into the emulsion. At the impression point, the emulsion is displaced or evaporated forming a clearly defined, circular, black-looking bead providing stable and regular marking symbols with a high contrast at bright image points. The stylus can be heated in a number of ways, e.g., by a heating coil, inductively, through the discharge of a capacitor through a stylus contructed as an electrical resistor, and by pressing a preheated crystal into the emulsion. However, such thermal methods are disadvantageous since the stylus heating required relatively high temperatures of up to 300° C., the irradiated heat adversely influences the accuracy of the apparatus, and the preheating of the stylus leads to a relatively long marking cycle reducing productivity.

SUMMARY OF THE INVENTION

Objects of the present invention involve providing a method and an apparatus for marking image points in photogrammetric surveys wherein marks are easily and quickly made in the surface of photographic material using an unheated stylus and without interfering heat, and wherein the optical quality of the marks are at least as good as the marks formed by conventional thermal methods.

The foregoing objects are obtained by a method for making image points in photogrammetric surveys, comprising moving the stylus to briefly engage and press against a surface of photographic material, and then oscillating the stylus at an ultrasonic frequency to form a marking symbol in the surface.

The foregoing objects are also obtained by an apparatus for marking image points in photogrammetric surveys comprising a stylus, a mechanical lowering device an electroacoustic transducer and an operating circuit. The lowering device is coupled to the stylus and moves the stylus against a surface of photographic material. The electroacoustic transducer is coupled to and oscillates the stylus at an ultrasonic frequency. The operating circuit is coupled to and operates the transducer, and includes a freqency generator, an amplifier and a voltage/current converter connected in series with the transducer.

The method for marking image points in photogrammetric surveys according to the present invention is based on methods in which a stylus is used for forming an optical marking symbol on the surface of the photographic material. According to the invention, the stylus penetrating the photographic material is excited to oscillate at a frequency in the ultrasonic range. When the stylus penetrates the photographic emulsion coating, part of the oscillation energy is converted into local frictional heat leaving a permanent deformation, after solidification, in the coating material heated and displaced by the stylus.

This method produces a marking symbol appearing as a high contrast annular bead in the photographic emulsion. Unlike conventional thermal methods, the present method limits the energy emitted by the emulsion to a quantity which is just sufficient for producing the desired marking symbol. Apart from producing the marking symbol, no significant interference and attendant phenomena are produced. Thus, the emulsion material is carefully treated such that the emulsion is still retained in the center of the marking symbol. This advantageously and carefully treats the emulsion. Other advantages include short repetition periods or repeat times, rapid adaptation to different emulsion characteristics, constant marking quality, good long-term constancy, etc. The aforementioned disadvantages of the known methods are eliminated. Through the choice of the stylus diameter and pressure, the marking symbols can be adapted in an optimum manner to the optical requirements of the plotting operator and the mechanical requirements of the film material (i.e., emulsion, carrier, etc.).

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE PREFERRED EMBODIMENTS

Figure 1:
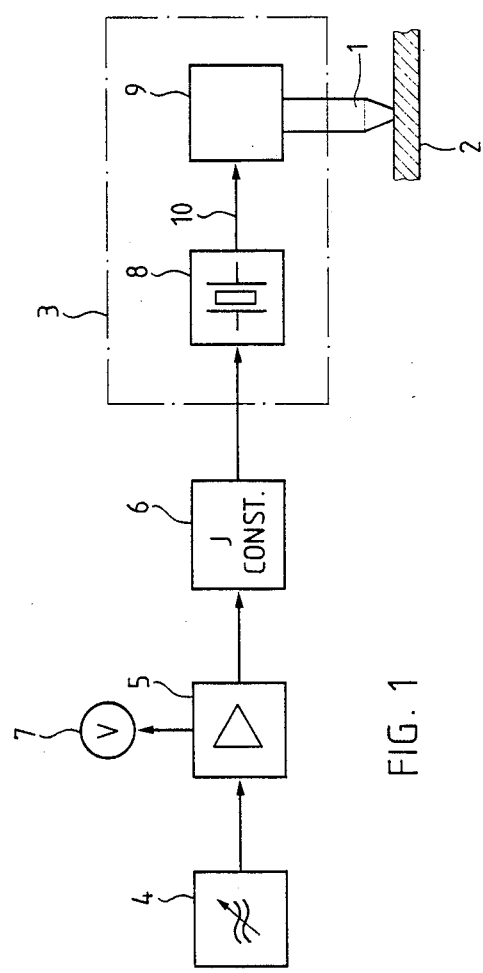
FIG. 1 is a schematic diagram of an apparatus for marking image points according to the present invention having an electroacoustical transducer for exciting the stylus.

According to the basic diagram of the apparatus in FIG. 1, a marking stylus 1 is pressed into the coating 2 of a photographic film or plate by means of a mechanical lowering device. A suitable lowering device is conventional and can comprise a sliding or rolling guide. The moving parts are guided on the guide and their weight is compensated by the stylus. The movement is controlled by a cam plate. With this controlled guidance, an extremely precise movement sequence is obtained, which sequence can be determined by the cam plate construction.

Stylus 1 is ultrsonically oscillated by an electroacoustic transducer 3. The transducer received a signal in the ultrasonic frequency range from a frequency generator 4 across an amplifier 5 and a voltage/current converter 6.

Generator 4 comprises a variable-frequency oscillator with a preferred frequency range between 70 and 80 kHz, but other frequencies ranges (e.g. 50 to 500 kHz) are also suitable. The amplitude of the generator signal is kept constant by a control circuit, particularly in a load-independent manner, so that there is no need to monitor one method parameter. The oscillator frequency can be matched to the characteristics of transducer 3 coupled to stylus 1. Amplifier 5 is a power amplifier and amplifies the signal of generator 4. The amplitude of the amplified signal can be measured in amplifier 5 with any reactive effect on generator 4, which measurement is performed by measuring instrument 7. The measurement of this amplitude enables the operator to check the ultrasonic energy supplied at stylus 1, as a function of the quality of its attachment.

Electroacoustic transducer 3 comprises a piezo-oscillator 8 mechanically coupled to a resonator 9. Stylus 1 is fixed to resonator 9 such that the oscillations of piezo-oscillator 8 are transmitted to resonator 9. Piezo-oscillator 8 receives the signal of amplifier 5 across the voltage/current converter 6 for impedance matching purposes and to compensate for the capacitive part of piezo-oscillator 8. Converter 6 comprises a network of filters and transformers. The piezo-oscillator 8 is excited by a constant amplitude alternating current.

The frequency of generator 4 is matched with the resonant frequency of the system formed by resonator 9 and stylus 1. Within the captive range, the resonance is readjusted through the amplitude of the alternating current supplied to the piezo-oscillator. Thus, power regulation of the ultrasonic energy supplied to the emulsion takes place in the voltage/current converter 6.

The completely satisfactory mechanical connections of piezo-oscillator 8 to resonator 9 and of resonator 9 to stylus 1 are very important for the quality of the electroacoustic energy conversion. Piezo-oscillator 8 is bonded or joined to the resonator 9, e.g. by a locking screw, as indicated by arrow 10. The mounting of resonator 9 is also important for the quality of the electroacoustic energy conversion. As resonator 9 oscillates in the longitudinal wave mode, it can only be fixed to an oscillation node. The mechanical dimensions must be kept small to ensure good transient behavior. The duration of an ultrasonic oscillation is typically in the millisecond range.

Figure 2:
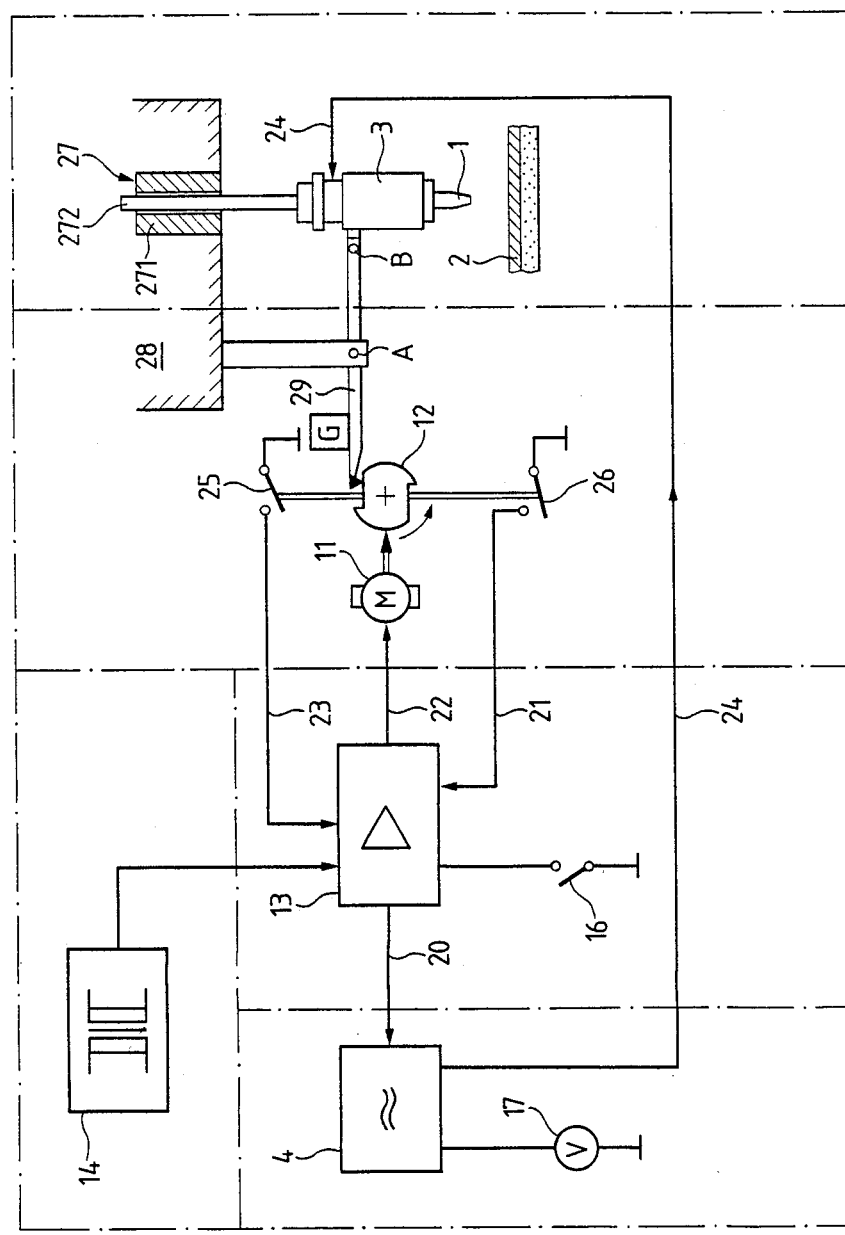
FIG. 2 is a schematic diagram illustrating preferred embodiment in detail with a lowering device for the stylus according to the present invention.

A preferred embodiment of the invention is illustrated in greater detail in FIG. 2. Transducer 3 receives the necessary ultrasonic signals through a line 24 from frequency generator 4. The frequency generator is regulated by a control device 13 through control line 20. An indicating instrument 17 is connected to frequency generator 4 for indicating the ultrasonic signal. A power pack 14 supplies power. A marking key 16 connected to control device 13 permits the marking process to be initiated.

A motor 11, connected by a supply line 22 to control device 13, is connected to a cam plate 12. A notch on the cam plate activates a microswitch 25 coupled by a line 23 to control device 13. Microswitch 25 switches on the frequency generator through control device 13 just after stylus 1 is placed on coating 2. A limit switch 26 stops motor 11 at the end of the marking process. Switch 26 is operated by cam plate 12 and is connected through line 21 to control device 13. The mechanical lowering device carrying the electroacoustic transducer 3, resonator and stylus 1 (FIG. 2) is guided vertically by a guide arrangement 27 which is connected to a stationary base element 28. This guide arrangement comprises a sleeve 271 which is attached to said stationary base element 28. In this sleeve 271 there is a rod 272 slidably placed, one end of which is coupled to said transducer 3. The movement of the lowering device is actuated by a two armed lever 29, which is supported by a pivot axis A, the ends of which are fixed in said base element 28. Said transducer 3 is connected to the lever 29 at a second pivot point B on one of the arms of said pivot lever 29. The other arm of said pivoted lever 29 engages said cam plate 12, whereby the end portion of said pivot lever 29 is in gliding contact with said plate 12. The weight of the lowering device is compensated by a compensating element G at the last mentioned arm of pivot lever 29. The mechanical lowering device slowly lowers said components and gently applies stylus 1 to coating 2. After starting the process by activating marking key 16, there is a continous lowering and raising movement until the initial position on the cam plate is again reached. The movement process can be stopped at any time. After renewed operation of the marking key, the movement can be continued further. According to a preferred embodiment, ball-mounted rollers precisely guide the lowering device. The impression pressure of stylus 1 is adjusted by means of a balance acting as a counter-weight.

Figure 3:
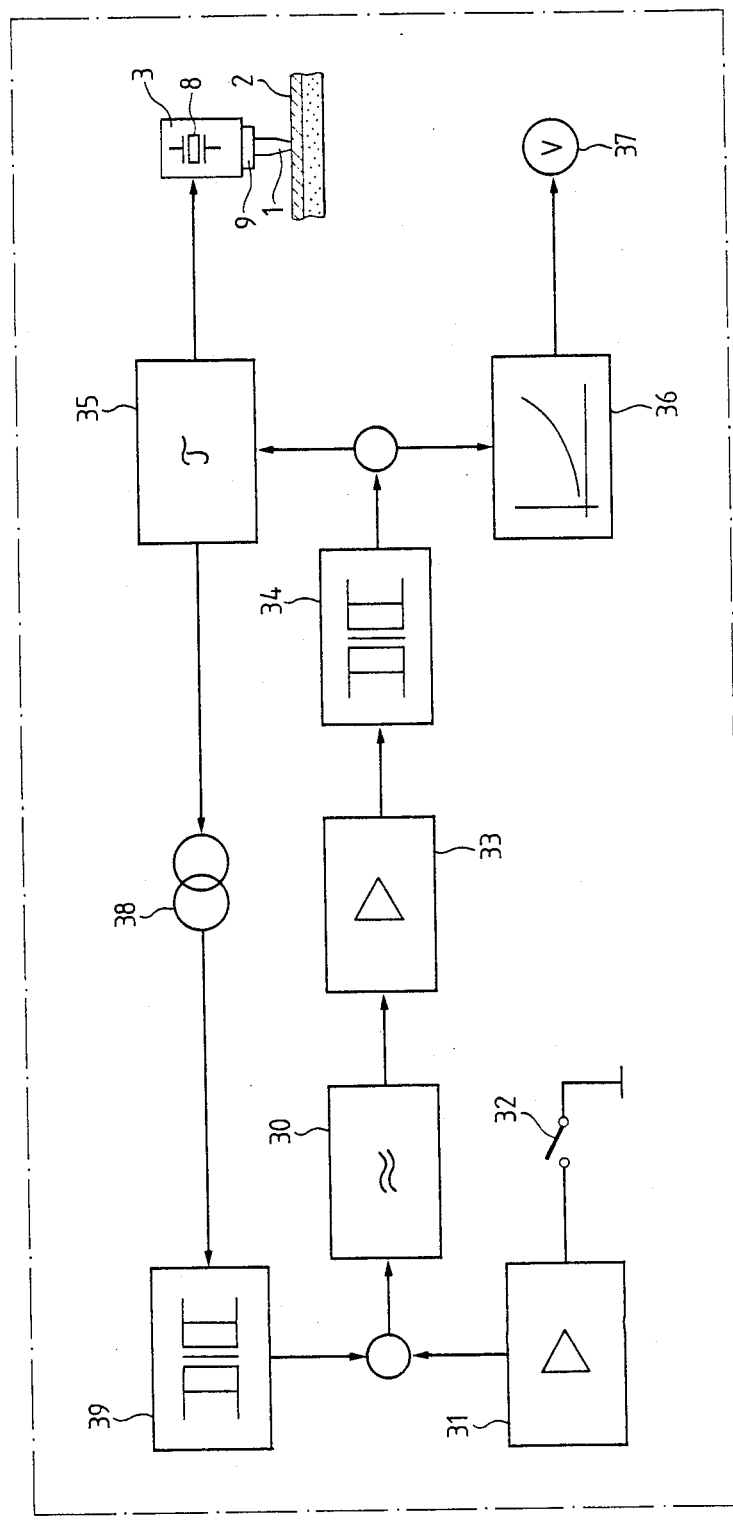
FIG. 3 is a diagram illustrating a preferred wiring arrangement for the ultrasonic unit for exciting the stylus according to the present invention.

Referring to FIG. 3, a more detailed illustration of the ultrasonic unit used for controlling the stylus is provided. An ultrasonic oscillator is switched on by a switching unit 31 activated by a switch 32. The initial signal of oscillator 30 passes through a power amplifier 33 and then a transformer stage 34 for matching to the necessary impedance. The capacitive part of piezo-oscillator 8 is compensated in a filter 35 such that the piezo-oscillator is excited by a constant amplitude alternating current. By means of a matching stage 36, the amplitude of the amplified ultrasonic signal can be measured with the aid of a measuring instrument 37 without any reactive effect on oscillator 30. The measurement of this amplitude enables the operator to check the ultrasonic energy given off by stylus 1, as a function of the quality of its attachment.

Transformer stage 34 and filter 35 constitute a voltage/current converter regulating the power of the ultrasonic energy supplied to coating 2. The frequency of oscillator 30 is matched with the resonant frequency of the system formed by resonator 9 and stylus 1. The resonance within the captive range is readjusted by the amplitude of the alternating current source 38 and a transmitter 39 are provided for the automatic frequency control of oscillator 30.

While various embodiments have been chosen to illustrate the invention, it will be understood by those skilled in the art that various changes and modifications can be therein without departing from the scope of the invention as defined in the appended claims.

What is claimed:

1. Method for producing at least one mark in an element of photographic material having a coating of photographic emulsion with a stylus oscillated at a frequency within the ultrasonic range comprising the steps of:
   moving said stylus against said element to such depth that a tip of the stylus penetrates a superficial layer of the coating;
   oscillating the stylus at said ultrasonic frequency converting oscillating energy into local frictional heat and forming a permanent structural deformation in the superficial layer of the coating, said deformation defining a high contrast a annular bead with emulsion being retained at its center, said bead constituting mark;
   moving the stylus away from the coating after formation of said bead; and
   moving the element to locate another discretely spaced point on the element under the stylus for forming another mark thereat.

2. An apparatus for producing at least one mark in a carrier element, comprising:
   a stylus having a tip;
   a carrier element of photographic material having photographic emulsion coating;
   an electroacoustic transducer coupled to said stylus;
   mechanical lowering means, coupled to said transducer for moving the tip of said stylus into and out of engagement with a superficial layer of said coating;
   operating circuit means electrically coupled to said transducer, for supplying electrical energy causing the tip of said stylus to form a permanent structural deformation in said coating, when said tip engages said superficial layer, said deformation defining a high contrast annular bead with emulsion being retained at its center, the bead constituting a mark, said operating circuit means including a frequency generator producing a signal with a frequency in an ultrasonic range; and
   marking key means for initiating operation to form a mark.

3. An apparatus as defined in claim 1 wherein said operating circuit means comprises a power amplifier having an input connected to an output of said frequency generator, and a voltage/current converter interconnected between said power amplifier and said electroacoustic transducer.

4. An apparatus as defined in claim 3 wherein said electroacoustic transducer comprises a piezo-oscillator supplied by said energy having the frequency in the ultrasonic range, a resonator carrying said stylus and coupled by mechanical means to said piezo-oscillator.

5. An apparatus as defined in claim 2 wherein a control device controls operation of the apparatus; and said marking key is connected to a main input of said control device.

6. An apparatus as defined in claim 5 wherein said mechanical lowering means comprises a base element attached to a beam, a free end of said beam comprises a first pivot axis; a two armed lever is pivotable about said axis, one end of said lever carries said electroacoustic transducer; and the other end of said lever engages a means for mechanical displacement of said transducer.

7. An apparatus as defined in claim 6 wherein the means for mechanical displacment comprises a cam plate driven by a motor; said other end of the lever engages said cam plate; and said motor is controlled by said control device.

8. An apparatus as defined in claim 6 wherein first and second switches are controlled by the cam plate, the first switch operating the frequency generator through said control device just after the stylus is placed on the coating, the second switch stopping the motor at the end of a marking operation.

9. An apparatus as defined in claim 6 wherein the mechanical lowering means comprises a guide arrangement having a sleeve embedded in the base element and a rod slidable in said sleeve, said rod being secured to the transducer, said transducer being connected to the lever at a second pivot axis.

10. An apparatus as defined in claim 6 wherein one half of said lever engages the cam plate and is provided with a counter-weight for balancing the weight of the transducer.

11. An apparatus as defined in claim 4 wherein said voltage/current converter comprises a transformer stage and a filter connected in series, said filter having a second output connected to a constant current source, an output of said source is led through a matching stage to a first gate, a first output of the gate being connected to a control input of the frequency generator.

12. An apparatus ad defined in claim 11 wherein a second gate is interconnected between said filter and the transformer stage; a measurement instrument is connected through a matching stage to a second output of said second gate; a switching unit, actuated by a switch, is connected to a second input of the first gate; whereby said switching unit and the switch together with said measurement instrument serve for adjustment of the coupling betwen the resonator and the stylus without lowering the transducer thereby.

13. A method according to claim 1 wherein the stylus is oscillated at an ultrasonic frequency between about 50 to about 500 kHz.

14. A method according to claim 1 wherein the stylus is oscillated to form a high contrast annular bead in the surface with emulsion retained within the bead.

* * * * *